Dec. 7, 1926.

J. S. TORMEY 1,609,446

CHANNEL BRACKET

Filed June 30, 1925

Inventor
James S. Tormey.
By Lyon & Lyon
Attorneys

Patented Dec. 7, 1926.

1,609,446

UNITED STATES PATENT OFFICE.

JAMES S. TORMEY, OF LOS ANGELES, CALIFORNIA, ASSIGNOR TO UNITED STATES BUMPER COMPANY, INC., A CORPORATION OF CALIFORNIA.

CHANNEL BRACKET.

Application filed June 30, 1925. Serial No. 40,636.

This invention relates to channel brackets and is more particularly directed to a channel bracket for use in mounting bumpers or bumper supporting rods to the frame members of a vehicle.

Many different types of brackets are now in use for mounting bumpers or bumper supporting rods to the frame of vehicles. Many of these bumpers employ what is commonly known as a jay bolt which hooks under one member of the channel irons which form the frame of the vehicle. These jay bolts grip only a short section of the metal forming the channel iron and are secured to the channel iron in such a manner as to make their hold on the channel iron very ineffective, in many cases a slight jolt, such as is imparted thereto by kicking the same, completely dislodging the jay bolt and permitting the bumper to fall upon the ground. Many other types of bumper brackets are employed, many of which require the special boring of holes in particular positions in channel irons of the vehicle frame which weakens the same. It is, therefore, an object of this invention to provide a channel iron bracket that is adapted to be secured to the channel iron of a vehicle frame in such a manner that the same is rigidly affixed thereto and which does not require the boring or punching of a hole in the channel irons.

Another object of this invention is to produce a channel iron which is of inexpensive construction and which may be easily installed in position and which when so installed is extremely well adapted to support the bumper or bumper supporting rod in relation to the vehicle frame.

Other objects and advantages of this invention will be apparent from the following detailed description of a preferred embodiment thereof as illustrated in the accompanying drawings, in which drawings Fig. 1 is an end elevation, partly in section, of a channel bracket embodying this invention, illustrating the same as mounted in position upon a section of a channel iron.

Figure 1:
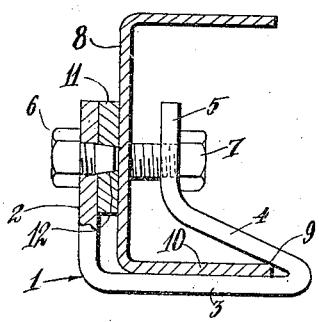

In the preferred embodiment of this invention illustrated in the accompanying drawings, 1 generally indicates a section or strip of spring steel or like metal having an upwardly extending outer portion 2, a transversely extending bottom portion 3 and an inclined portion 4 terminating in an upwardly extending inner portion 5. Screw threaded through the portion 2 is a bolt 6 and screw threaded through the inner portion 5 is a bolt 7 which bolts 6 and 7 are in the modifications of this invention illustrated in Figs. 1, 3 and 4, aligned so that when the bolts 6 and 7 are tightened into position a continuous line of pressure is presented through the bolt 6, channel iron 8 and the bolt 7, the bolt 6 being preferably tightened so that the under edge 9 of the curved section 4 engages the lower web 10 of the channel iron 8 so that the bracket is prevented from slipping from or being rotated from position.

The bumper supporting rod 11, having a bore 12, is mounted upon the end of the bolt 6 so that the same is engaged in position against the side of the channel iron 8, the bolt 6 having a tapered end from the threaded portions thereof and the bore 12 formed in the arm 11 being of slightly less diameter than the diameter of the bolt 6 so that the bore is wedged and maintained in position.

Figure 2:
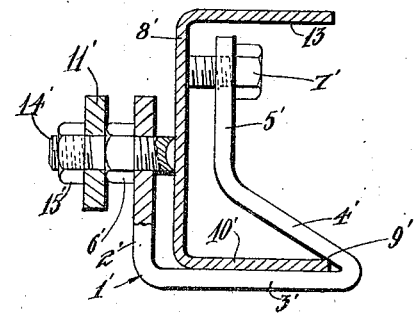
Fig. 2 is an end elevation, partly in section, of a modified form of channel bracket embodying this invention.

Referring now to Fig. 2, the modification therein illustrated is entirely similar to the modification illustrated in Fig. 1 except for the fact that the upwardly extending section 5' thereof is extended upward to a point near the upper web 13 of the channel iron 8' and the bolt 7' is screw threaded therethrough so that the inner end thereof engages the channel iron at a point above the point of engagement of the bolt 6' and for the further fact that the bumper supporting bar 11' is mounted upon an outwardly extending portion 14' of the bolt 6' and is maintained in position thereon by means of a separate nut 15'.

The bolt 6' is provided at its engaging end with a chamfered point so that the same will tend, as the same is screw-threaded into the vertical section 2', to cut into the channel iron 10'. The bolt 6' is also screw-threaded at its outer end to receive the nut 15'.

Figure 3:
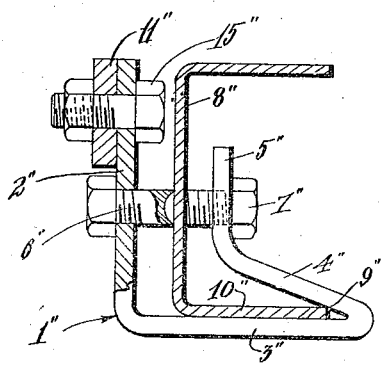
Fig. 3 is an end elevation, partly in section, of a second modified form of channel bracket embodying this invention.

The modification of my invention illustrated in Fig. 3 differs from the modifications shown in Fig. 1 in that the outer upright member 2'' is extended upward a sufficient distance beyond the bolt 6'' to permit the connecting of the bumper bar 11'' directly therewith by means of a bolt 15''. This modification is particularly desirable in many places wherein it is difficult to properly align the bumper supporting bar and wherein it is desired to elevate the bumper supporting bar.

Figure 4:
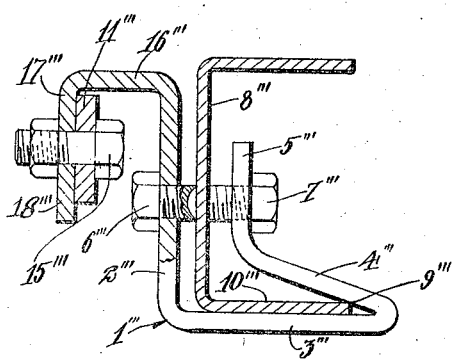
Fig. 4 is an end elevation, partly in section, of another modified form of channel bracket embodying this invention.
Figure 5:
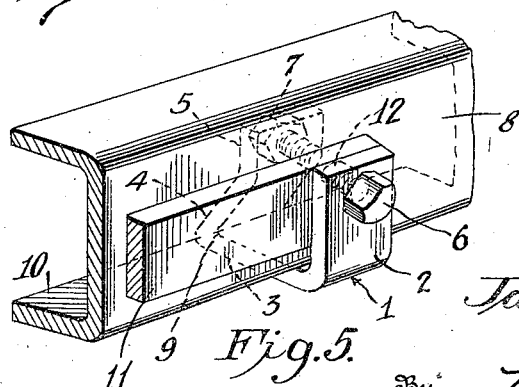
Figure 5 is a perspective view of a channel bracket embodying this invention, as illustrated in Figure 1.

The modification illustrated in Fig. 4 differs only from the modifications shown in Fig. 3 in that the portion 2''' of the bracket is constructed of greater length and bent outwardly as illustrated at 16''' and then downwardly (or forwardly) as illustrated at 17''' to provide a section 18''' to which the bumper bar 11''' may be secured by means of a bolt 15'''. This modification is particularly desirable wherein the horn of the vehicle frame projects laterally a considerable distance beyond the channel iron 8''' and where it is desirable to provide clearance for the bumper supporting bar 11'''.

The channel brackets herein illustrated are particularly adapted for supporting bumpers or securing bumpers to the frame of a motor vehicle, the channel irons 8 being the channel iron frames of the vehicle frame construction to which it is desired to secure the bumper. The arms 11 of the bumper supporting arms are secured to the bumper structure in any desired or preferred manner as is well understood in the art and which extend rearwardly from the bumper structure. Two of such bumper supporting arms 11 are provided for securing the bumper to the oppositely disposed channel irons 8 of the vehicle frame. By the use of such channel iron brackets, the bumper supporting arms 11 may be secured to the channel irons 8 of the motor vehicle frame without the necessity of forming holes in the channel irons of the motor vehicle frame, which holes do to a certain degree weaken the frame structure. The channel iron brackets provided by this invention are also adapted to be positioned at any desired point along the longitudinally extending channel irons 8 of the motor vehicle frame so as to provide an easy means of adjusting the position of the bumper structure either to the front or the rear of the motor vehicle so that the said bumper structure may be projected to the desired and correct degree in front of the said motor vehicle.

In securing the channel brackets embodying this invention to the channel irons 8, the bolts 7 are screw-threaded through the vertical portions 5 of the channel iron bracket 1 to a position so that the ends of said bolts will be in position to engage the channel irons 8 so that the inclined portion 4 will engage the end 9 of the transverse portion 10 of the channel irons 8. After having been so adjusted, the bolts 7 are not further screw-threaded in the vertical extension 5 but remain in position. The tightening of the channel iron bracket upon the channel iron 8 is effected by means of the bolts 6 which are screw-threaded through the vertical extensions 2 so as to force the inclined portion 4 tightly into engagement with the edge 9.

Many other modifications of this invention might be equally well illustrated. However, it is believed that sufficient modifications thereof have been set forth to enable those skilled in the art to which this pertains to see clearly the great range of flexibility to which this invention is susceptible, and while many such modifications are herein set forth, it is understood that I do not wish to be limited to any one of the exact modifications, but that my invention is of the scope of the appended claims.

I claim:

1. A bumper bracket comprising a strip of metal formed to provide an upwardly extending end section, a transversely extending section, an inclined section, a second upwardly extending section, means mounted in the latter said section for securing the strip of metal to a channel iron, and means secured to the first upwardly extending section for securing the same to a bumper bar.

2. A device of the class described, comprising a strip of metal formed to provide an upwardly extending end section, a transversely extending section, an inclined section and a second upwardly extending section, means secured to the latter said section for engaging a channel iron, and means secured to the first said end section for engaging the opposite side of the said channel iron.

3. A device of the class described, comprising a bent strip of metal formed to provide an upwardly extending end section, a transversely extending section, an inclined section, a second upwardly extending section, a bolt screw-threaded to the latter said section to engage a channel iron, and a bolt screw-threaded to the first said end section for engaging the opposite side of the channel iron at the same elevation.

4. In a bumper bracket, the combination of a strip of steel bent to form two upwardly extending sections and a transverse section, one of the first said sections being bent toward the other, a bolt screw-threaded to each upwardly extending section in position to engage opposite sides of a channel iron, and means secured to one of said upwardly extending sections for securing the same to a bumper bar.

Signed at Los Angeles, Calif. this 30th day of May 1925.

JAMES S. TORMEY.